United States Patent [19]

Takamura et al.

[11] Patent Number: 4,763,145

[45] Date of Patent: Aug. 9, 1988

[54] WATER-RESISTANT CAMERA WITH AUTOMATIC INTERNAL AIR-PRESSURE ADJUSTMENT

[75] Inventors: Masashi Takamura; Seimei Ushiro; Kiyotaka Kobayashi; Michio Cho; Kimiaki Nakada, all of Tokyo, Japan

[73] Assignee: Fuji Photo Film Co., Ltd., Japan

[21] Appl. No.: 30,056

[22] Filed: Mar. 25, 1987

[30] Foreign Application Priority Data

| Mar. 26, 1986 | [JP] | Japan | 61-68178 |
| Apr. 18, 1986 | [JP] | Japan | 61-58479[U] |
| Apr. 18, 1986 | [JP] | Japan | 61-58480[U] |
| Apr. 18, 1986 | [JP] | Japan | 61-59374[U] |
| Apr. 18, 1986 | [JP] | Japan | 61-59375[U] |
| Apr. 18, 1986 | [JP] | Japan | 61-90537 |
| Apr. 18, 1986 | [JP] | Japan | 61-90538 |

[51] Int. Cl.⁴ .......................... G03G 17/08
[52] U.S. Cl. ................................. 354/64
[58] Field of Search ............................ 354/64

[56] References Cited

U.S. PATENT DOCUMENTS 1,131,712  3/1915  Klein .................... 354/64 X
4,653,883  3/1987  Maeno .................... 354/64

Primary Examiner—Michael L. Gellner
Attorney, Agent, or Firm—Pasquale A. Razzano

[57] ABSTRACT

A water-resistant camera has a lens barrel movable toward and away from a fluid-tight camera body for selecting the position of the lens barrel between wide-angle and telephoto positions. The camera has or can be combined with an automatic air-pressure adjusting mechanism for automatically keeping the air pressure in the inner space of the camera at a substantially constant level irrespective of the position of the lens barrel between the wide-angle position and the telephoto position. Therefore, the lens barrel can smoothly be moved with respect to the camera body upon switching between the wide-angle and telephoto positions.

23 Claims, 15 Drawing Sheets

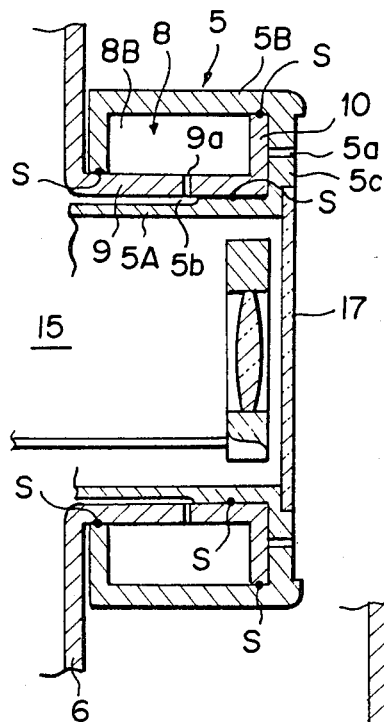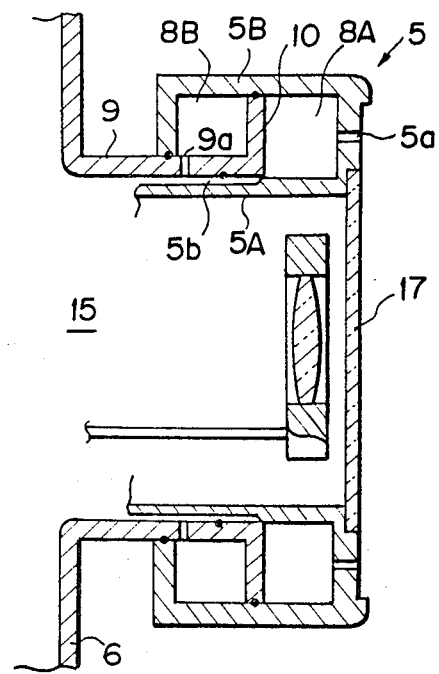

F I G. 16
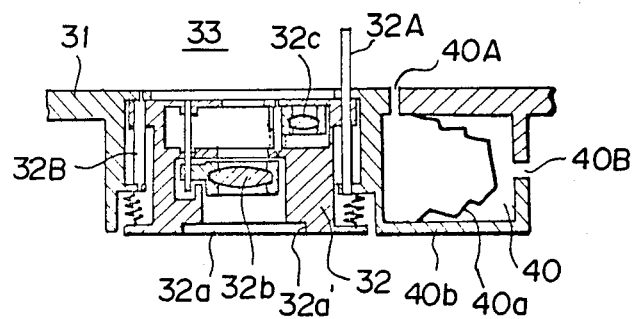
F I G. 17
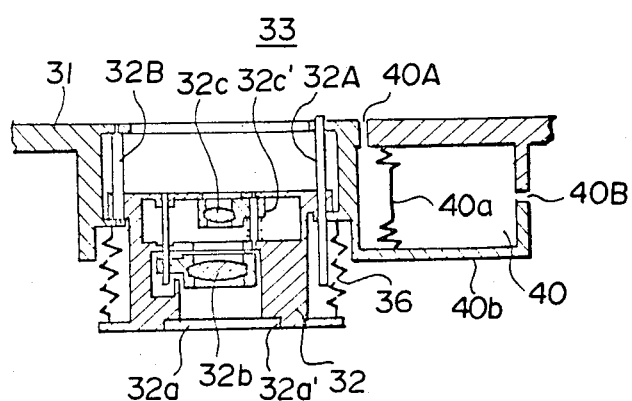

F I G. 33
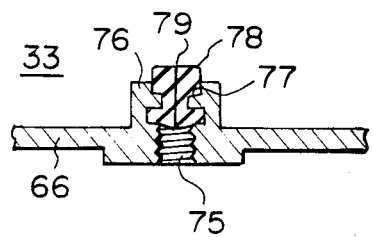
F I G. 34
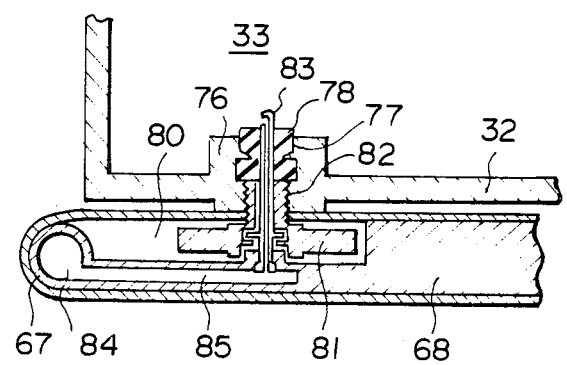
F I G. 35
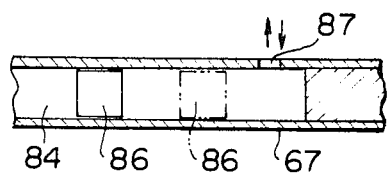

WATER-RESISTANT CAMERA WITH AUTOMATIC INTERNAL AIR-PRESSURE ADJUSTMENT

BACKGROUND OF THE INVENTION

1. Field of the Invention

The present invention relates to a water-resistant camera, and more particularly to a water-resistant camera for taking pictures underwater or in humid environments, the camera having a lens barrel or mount movable toward and away from the fluid-tight camera body.

2. Description of the Prior Art

Some cameras have lens barrels or mounts movable toward and away from the camera bodies. Movable lens barrels or mounts are designed to vary the distance between the foremost lens (or the front glass panel in front of the foremost lens) and the focal plane in the camera body over a relatively large range in order to switch between telephoto and wide-angle modes, to effect zooming, or to move a collapsible lens assembly toward and away from the camera body.

The camera body of a water-resistant camera for underwater or beach use is normally fluid-tight when close, and it cannot allow for air pressure variations therein. Therefore, it would be impracticable to incorporate movable lens barrels in water-resistant cameras, because back-and-forth movement of the lens barrel would change the volume of the entire camera body including the lens barrel, thus varying the air pressure in the camera. Another known water-resistant camera type has an electronic flash selectively movable into a projected position out of the camera body for use and into a retracted position in the camera body for storage. Movement of the electronic flash into and out of the camera body would also cause variations in the air pressure in the camera body.

Consequently, water-resistant cameras with movable lens barrels and/or electronic flashes are not of a fluid-tight structure in a strict sense. For taking pictures with such a camera having a movable lens barrel and/or electronic flash, it has been customary to place the camera in a transparent water-resistant case, and to operate the camera from outside of the case when it is used underwater or in a humid environment. This practice is however quite awkward because the camera is not handled directly by the user.

SUMMARY OF THE INVENTION

It is an object of the present invention to provide a water-resistant camera having a lens barrel or mount movable toward and away from the camera body which is of a highly fluid-tight structure, the camera having means for automatically adjusting the air pressure in the camera in response to movement of the lens barrel.

Another object of the present invention is to provide a water-resistant camera with a movable lens barrel or mount, which can be handled with case.

According to the present invention, there is provided a water-resistant camera including a fluid-tight camera body, a lens barrel mounted on the camera body and movable toward and away from the camera body in a fluid-tight manner, the camera body and the lens barrel having an inner space, and an automatic air-pressure adjusting mechanism communicating or adapted to communicate with the inner space for automatically maintaining the air pressure in the inner space at a substantially constant level regardless of movement of the lens barrel toward and away from the camera body.

Since the air pressure in the inner space is held substantially constant, the lens barrel can smoothly be moved toward and away from the fluid-tight camera body.

The above and other objects, features and advantages of the present invention will become more apparent from the following description when taken in conduction with the accompanying drawings in which preferred embodiments of the present invention are shown by way of illustrative example.

BRIEF DESCRIPTION OF THE DRAWINGS

FIGS. 7 and 8 are fragmentary horizontal cross-sectional views of a water-resistant camera according to yet another embodiment of the present invention, the views showing a wide-angle position and a telephoto position, respectively;

FIGS. 16 and 17 are fragmentary horizontal cross-sectional views of the water-resistant camera illustrated in FIGS. 14 and 15;

FIG. 33 is an enlarged cross-sectional view of a connector on the camera body of the camera shown in FIG. 32;

FIG. 34 is an enlarged fragmentary cross-sectional view of a camera protector mounted on the camera illustrated in FIG. 32; and FIG. 35 is an enlarged fragmentary cross-sectional view of a portion of the camera protector.

DESCRIPTION OF THE PREFERRED EMBODIMENTS

Figure 1:
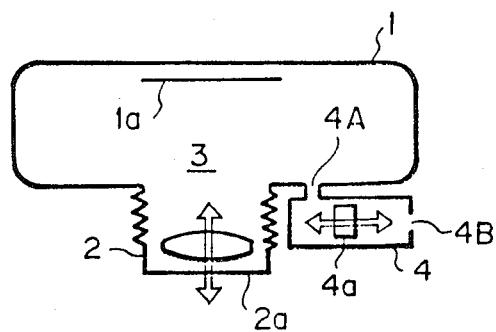
FIG. 1 is a schematic horizontal cross-sectional view showing a principle of the present invention.

Like or corresponding parts are denoted by like or corresponding reference characters throughout several views.

As shown in FIG. 1, a water-resistant camera according to the present invention includes a camera body 1 and a lens barrel 2 mounted on a front panel of the camera body 1. The lens barrel 2 is movable toward and away from the camera body 1 in a fluid-tight manner so that the distance between a foremost glass panel 2a of the lens barrel 2 and the focal plane 1a in the camera body 1 can be varied continuously. The camera has an inner space 3 whose volume varies in response to movement of the lens barrel 2 toward and away from the camera body 1, the inner space 3 including the space in the camera body 1 and the space in the lens barrel 2. A cylinder 4 is mounted on the front panel of the camera body 1. The cylinder 4 has a port 4A in one end communicating with the inner space 3 of the camera and another port 4B in the opposite end which is vented to the exterior or atmosphere. Within the cylinder 4, there is disposed a piston 4a slidably movable in the cylinder 4 in response to back-and-forth movement of the lens barrel 2 for keeping the air pressure in the inner space 3 at a substantially constant level. More specifically, when the lens barrel 2 is retracted (upwardly in FIG. 1), the air pressure in the inner space 3 is increased to push the piston 4a to the right. When the lens barrel 2 is pushed out (downwardly in FIG. 1), the air pressure in the inner space 3 is reduced to move the piston 4a to the left under external air or water pressure. Of course, the air pressure in the inner space 3 is increased when the camera is placed underwater, and is lowered when in air.

The cylinder 4 may be positioned anywhere on the camera insofar as its one port on one side of the piston 4a communicates with the inner space 3 and the other port on the other side of the piston 4a is vented to the exterior.

Further, the cylinder 4 may be separate from the camera body 1, and may be detachably connected to the camera body 1 through a tube or the like fitted in a connector hole defined in the camera body 1. With this arrangement, the cylinder 4 can be attached to the camera body 1 when the camera is used underwater, and can be detached from the camera body 1 when the camera is in normal use in air. When the camera is used in air, therefore, it is light in weight. When the cylinder 4 is not connected, the connector hole in the camera should be closed by a plug for preventing light and dust from entering the camera body 1.

Figure 2:
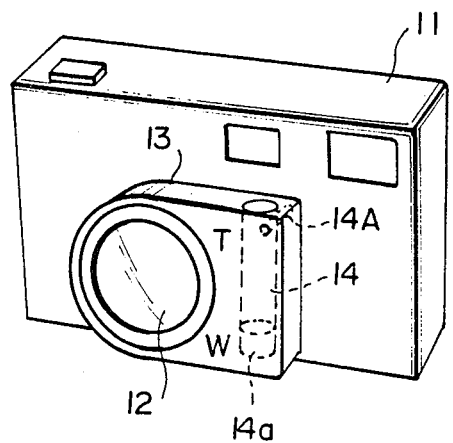
FIGS. 2 and 3 are perspective views of a water-resistant camera according to an embodiment of the present invention, the views showing a wide-angle position and a telephoto position, respectively.
Figure 3:
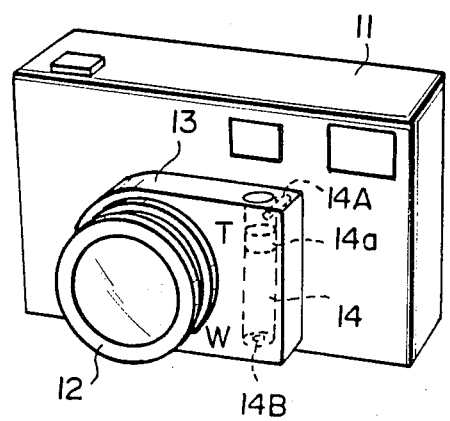

FIGS. 2 and 3 show a water-resistant camera for underwater use according to an embodiment of the present invention. A block 13 having a lens barrel 12 and a cylinder 14 is secured to the front panel of a camera body 11, the cylinder 14 being vertically disposed laterally of the lens barrel 12. The cylinder 14 defined in the block 13 has a port 14B defined in the lower end thereof and vented to the exterior, and another port 14A defined near the upper end thereof in communication with the inner space in the camera body behind the lens barrel 12. A piston 14a is movably disposed in the cylinder 14 to isolate the ports 14A, 14B from each other in a fluid-tight manner. The piston 14a is vertically movable in response to variations in the air pressure in the inner space of the camera.

In FIG. 2, the lens barrel 12 is shown retracted back into the camera body to a wide-angle position while the camera is used underwater. At this time, the inner space of the camera is reduced in volume, and an increased air-pressure buildup in the inner space pushes the piston 14a downwardly in the cylinder 14. The downward movement of the piston 14a reduces the air pressure in the inner camera space.

In FIG. 3, the lens barrel 12 is shown projected out of the camera body to a telephoto position. Since the inner space of the camera is expanded, the air pressure therein is lowered thereby to allow water pressure outside of the camera to push the piston 14a upwardly in the cylinder 14. The air pressure in the inner camera space is now increased. Therefore, the air pressure in the inner camera space remains substantially constant irrespective of whether the lens barrel 12 is moved to the wide-angle position or the telephoto position.

The piston 14a may be colored, and the block 13 may partially be made transparent to permit the piston 14a to be visually observed from outside. Thus, the wide-angle position indicated by "W" and the telephoto position indicated by "T" can be recognized by the position of the piston 14a in the cylinder 14.

Figure 4:
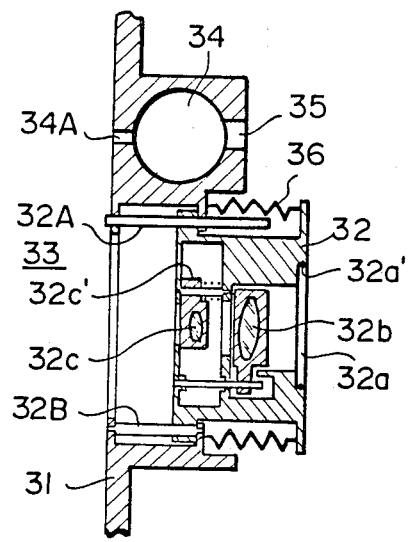
FIGS. 4 and 5 are enlarged horizontal cross-sectional views of the water-resistant camera shown in FIGS. 2 and 3.
Figure 5:
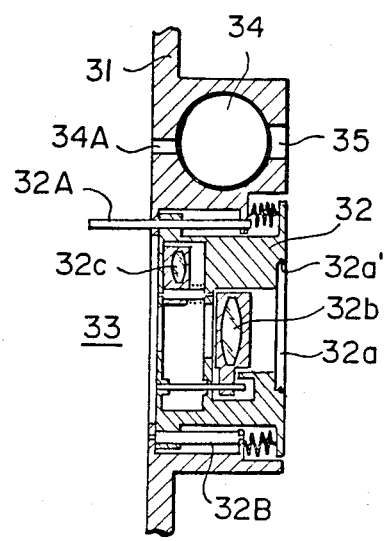

The water-resistant camera shown in FIGS. 2 and 3 is illustrated in greater detail in FIGS. 4 and 5.

A lens barrel 32 is mounted on the front panel of a camera body 31 for back-and-forth movement while being guided by guide pins 32A, 32B secured to the camera body 31. A front glass panel 32a is fixed to the front end of the lens barrel 32 by a water-resistant O-ring 32a'. The lens barrel 32 houses therein an objective lens 32b disposed behind the front glass panel 32a and a converter lens 32c behind the objective lens 32b. The converter lens 32c is laterally movable into and out of the optical path of the lens barrel 32. The converter lens 32c is operated by a switching mechanism (not shown) to move out of the optical path when the lens barrel 32 is retracted into a wide-angle position (FIG. 5) and to move into the optical path when the lens barrel 32 is projected into a telephoto position (FIG. 4). The camera has an inner space 33 behind the lens barrel 32, with a film (not shown) being placed in the inner space 33. The inner space 33 is held in communication via a port 34A with a vertical cylinder 34 defined laterally of the lens barrel 32 on the front panel of the camera body 31. A piston (not shown) is vertically movably disposed in the cylinder 34. A transparent display window 35 is disposed in front of the cylinder 34 to provide a selective indication of a wide-angle position or a telephoto position therethrough dependent on the position of the piston in the cylinder 34.

The lens barrel 32 and the camera body 31 are interconnected by a bellows 36 to provide a fluid-tight connection therebetween while allowing the lens barrel 32 to move toward and away from the camera body 31. The bellows 36 may be replaced with a slide seal.

For switching from the wide-angle position of FIG. 5 to the telephoto position of FIG. 4, the lens barrel 32 is pulled out away from the camera body 31 and the telephoto converter lens 32c is turned about a shaft 32c' into a position on the optical axis of the objective lens 32b. At this time, the volume of the inner space 33 is increased, and hence the piston is moved in the cylinder 34 to force air in the cylinder 34 via the port 34A into the camera body 31. Air or water is now allowed to enter the portion of the cylinder 34 which is on the other side of the piston. Therefore, the lens barrel 32 can easily be pulled out into the telephoto position shown in FIG. 4.

For switching from the telephoto position of FIG. 4 to the wide-angle position of FIG. 5, the lens barrel 32 is pushed toward the camera body 31 and the telephoto converter lens 32c is turned about the shaft 32c' out of a position on the optical axis of the objective lens 32b. At this time, the volume of the inner space 33 is reduced, increasing the air pressure in the inner space 33, and hence air in the inner space 33 is forced to flow via the port 34A into the cylinder 34. The piston is thus moved to force air or water from the other side of the piston out of the cylinder 34.

Since the inner space 33 communicates with the cylinder 34 when the lens barrel 32 is moved back and forth, variations in the volume of the inner space 33 can automatically be absorbed by the piston to allow smooth back-and-forth movement of the lens barrel 32.

Figure 6:
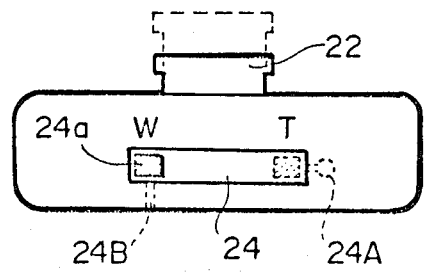
FIG. 6 is a plan view of a water-resistant camera according to another embodiment of the present invention.

FIG. 6 shows a water-resistant camera according to another embodiment of the present invention. In this embodiment, a cylinder 24 is mounted on the upper panel of the camera body. A piston 24a is slidably movably in the piston 24 in response to back-and-forth movement of a lens barrel 22 to selectively indicate a wide-angle position "W" and a telephoto position "T". The cylinder 24 has a port 24A at the righthand end thereof which communicates with the inner space of the camera body and another port 24A at the lefthand end thereof which is vented to the exterior.

FIGS. 7 and 8 illustrate a water-resistant camera according to yet another embodiment of the present invention.

The camera includes a lens barrel 5 mounted on a camera body 6 and supporting a foremost lens 7 at its front end. The lens barrel 5 is of a double-wall structure including inner and outer cylindrical barrel members 5A, 5B which are coaxial with each other and radially spaced from each other, with a space or chamber 8 defined therebetween. The camera body 6 includes an intermediate support cylinder 9 projecting outwardly into the chamber 8 of the lens barrel 5. The intermediate support cylinder 9 has an axial length substantially equal to the axial length of the lens barrel 5 and is fitted over the inner lens barrel member 5A. The lens barrel 5 is axially slidably supported on the support cylinder 9 for movement toward and away from the camera body 6. The support cylinder 9 has a radial partition 10 on its distal end having a length equal to the distance between the inner and outer barrel members 5A, 5B. The partition 10 divides the chamber 8 into outer and inner chambers 8A, 8B (FIG. 8) which are positioned in front of and behind the partition 10. When the lens barrel 5 is moved away from the camera body 6, the volume of the outer chamber 8A is increased whereas the volume of the inner chamber 8B is reduced.

The outer chamber 8A is vented to the exterior through a port 5a defined in a joint wall 5C interconnecting the front ends of the inner and outer barrel members 5A, 5B. The inner chamber 8B is held in communication with an inner space 15 through a port 9a defined in the support cylinder 9 and a passage 5b defined in the outer peripheral surface of the inner barrel member 5A.

The port 9a is positioned substantially in an axially central position on the support cylinder 9. The passage 5b extends axially along the inner barrel member 5A such that its distal end communicates with the port 9a when the lens barrel 5 is in retracted to a wide-angle position as shown in FIG. 7. Therefore, when the lens barrel 5 is projected to a telephoto position of FIG. 8, the inner chamber 8B remains in communication with the passage 5b through the port 9a whereas the outer chamber 8A is held out of communication with the passage 5b.

To make the inner space 15 and the inner chamber 8B completely resistant to water, suitable seals or other water-resistant means are provided in sliding areas S between the lens barrel 5, the support cylinder 9, and the partition 10.

When the lens barrel 5 is retracted to the wide-angle position as shown in FIG. 7, the volume of the inner space 15 is reduced and the volume of the inner chamber 8B is increased. When the lens barrel 5 is pulled out into the telephoto position as shown in FIG. 8, the inner space 15 is enlarged and the volume of the inner chamber 8B is reduced, forcing air out of the inner chamber 8B into the inner space 15 via the port 9a and the passage 5b. Therefore, the air pressure in the inner space 15 remains substantially constant. Upon movement of the lens barrel 5 away from the camera body 6, external air or water is introduced via the port 5a into the outer chamber 8A.

As the lens barrel 5 is slid from the telephoto position of FIG. 8 to the wide-angle position of FIG. 7, the volume of the inner space 15 is reduced thereby developing an air-pressure buildup in the inner space 15, and the volume of the inner chamber 8B is increased to reduce the air pressure therein. Therefore, air flows from the inner space 15 through the passage 5b and the port 9a into the inner chamber 8B. As a consequence, the air pressure in the inner chamber 15 is maintained at a substantially constant level.

Therefore, the lens barrel 5 can be moved smoothly between the wide-angle and telephoto positions while keeping the inner space 15 fluid-tight.

Figure 9:
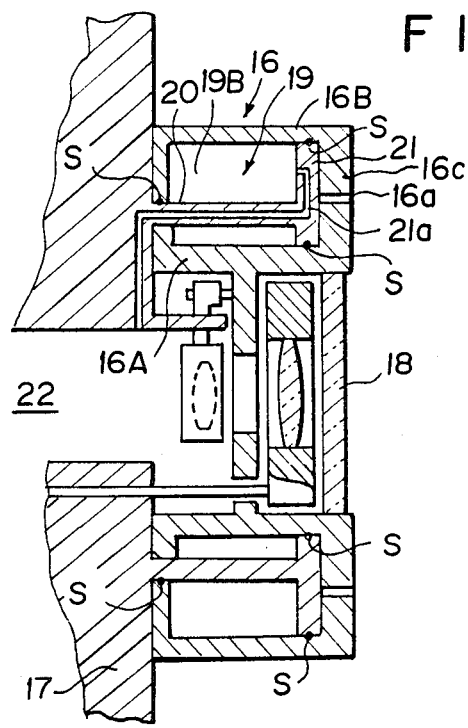
FIGS. 9 and 10 are fragmentary horizontal cross-sectional views of a water-resistant camera according to yet another embodiment of the present invention, the views showing a wide-angle position and a telephoto position, respectively.
Figure 10:
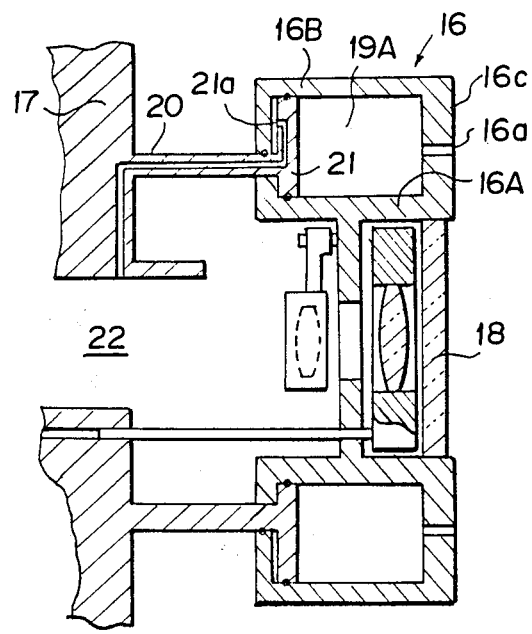

FIGS. 9 and 10 show a water-resistant camera constructed in accordance with yet another embodiment of the present invention. The camera includes a lens barrel 16 mounted on a camera body 17 and supporting a foremost lens 18 at its front end. The lens barrel 16 comprises a double-wall structure having inner and outer cylindrical barrel members 16A, 16B which are coaxial with each other and radially spaced from each other, with a space or chamber 19 defined therebetween. The camera body 17 includes an intermediate support cylinder 20 projecting outwardly into the chamber 19 of the lens barrel 16 and having a radial partition 21 on its distal end having a length equal to the distance between the inner and outer barrel members 16A, 16B. The partition 21 divides the chamber 19 into outer and inner chambers 19A, 19B. The support cylinder 20 and the partition 21 have a substantially T-shaped cross section and define therein a passage 21a through which the inner chamber 19B communicates with an inner space 22 of the camera. The inner and outer barrel members 16A, 16B are interconnected at their front ends by a joint wall 16C having a port 16a through which the outer chamber 19A is vented to the exterior.

When the lens barrel 16 is moved from the wide-angle position of FIG. 9 to the telephoto position of FIG. 10, air flows from the inner chamber 19B through the passage 21a into the inner space 22. Conversely, when the lens barrel 16 is moved backwards from the telephoto position to the wide-angle position, air flows from the inner space 22 through the passage 21a into the inner chamber 19B. Consequently, the lens barrel 16 can smoothly be moved between the wide-angle and telephoto positions while maintaining the air pressure in the inner space 22 at a substantially constant pressure level. The passage 21a defined through the support cylinder 20 and the partition 21 allows the lens barrel 16 to be projected until the partition 21 is positioned at the rear end of the lens barrel 16 within the chamber 19. Thus, the lens barrel 16 at the telephoto position can provide a larger telephoto ratio. During movement of the lens barrel 16, air or water is passed into or out of the outer chamber 19A through the port 16a.

Figure 11:
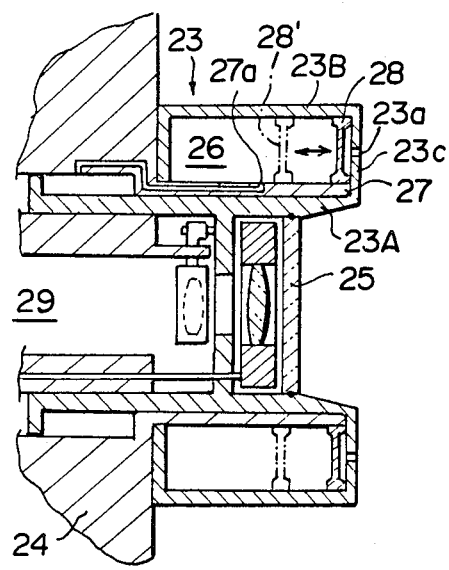
FIGS. 11 and 12 are fragmentary horizontal cross-sectional views of a water-resistant camera according to a further embodiment of the present invention, the views showing a wide-angle position and a telephoto position, respectively.
Figure 12:
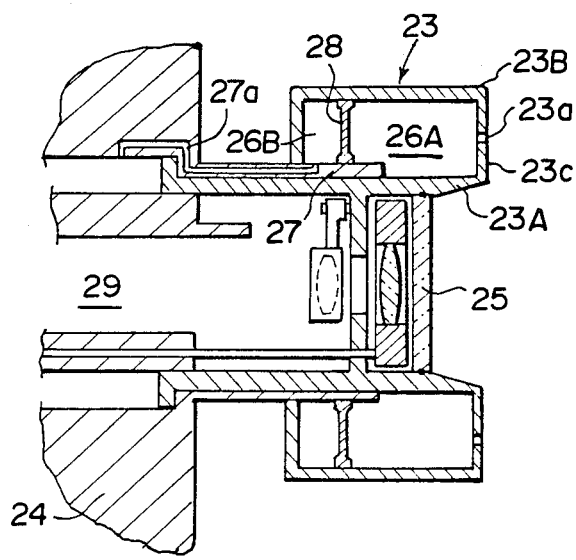

According to a further embodiment shown in FIGS. 11 and 12, a lens barrel 23 movably mounted on the front panel of a camera body 24 and supporting a foremost lens 25 on its front end is of a double-wall structure comprising an inner barrel member 23A and an outer barrel member 23B which are radially spaced from each other with a chamber 26 defined therebetween. An intermediate support cylinder 27 projects from the camera body 24 into the chamber 26. The support cylinder 27 has an axial length substantially equal to the axial length of the chamber 26 and is fitted over the inner barrel member 23A so that the lens barrel 23 is axially slidable on the support cylinder 27. A radial partition 28 is movably disposed in the chamber 26 and divides the chamber 26 into outer and inner chambers 26A, 26B (FIG. 12). The partition 28 is in the form of a doughnut-shaped plate axially movably disposed between the support cylinder 27 and the outer barrel member 23B.

The outer chamber 26A is vented to the exterior through a port 23a defined in a joint wall 23C interconnecting the outer and inner barrel members 23B, 23A. The inner chamber 26B communicates with an inner space 29 of the camera through a passage 27a defined in the support cylinder 27 and the camera body 24.

As the partition 28 is axially slidable in the chamber 26, it separates the outer and inner chambers 26A, 26B to prevent air or water which has entered the outer chamber 26A from leaking into the inner chamber 26B.

The passage 27a has a port opening into the chamber 26 at a substantially central position in the axial direction thereof. The partition 28 can thus be slid backwards to a position 28' (indicated by the dot-and-dash lines in FIG. 11) which is substantially at the center of the chamber 26 just in front of the port of the passage 27a.

Even when the lens barrel 23 is in a wide-angle position shown in FIG. 11, therefore, the partition 28 can slide back from the solid-line position to the dot-and-dash-line position as the external pressure introduced via the port 23a increases. When the external pressure decreases, the partition 28 is moved to the solid-line position. Such pressure adjustment can also be effected when the lens barrel 23 is in the telephoto position illustrated in FIG. 12.

To shift the lens barrel 23 from the wide-angle position of FIG. 11 to the telephoto position of FIG. 12, the lens barrel 23 is pulled away from the camera body 24, and hence the volume of the inner space 29 is increased thus reducing the air pressure in the inner space 29. The pressure in the inner chamber 26B communicating with the inner space 29 via the passage 27a is also reduced, whereupon the partition 28 is moved to the left so as to eliminate the pressure difference developed between the inner chamber 26B and the outer chamber 26A. The partition 28 stops in a position where there is no pressure difference between the chambers 26A, 26B. Therefore, the pressures inside and outside of the camera are kept substantially equal to each other even when the lens barrel 23 is slid from the wide-angle position of FIG. 11 to the telephoto position of FIG. 12.

When the lens barrel 23 is slid from the telephoto position of FIG. 12 to the wide-angle position of FIG. 11, the volume of the inner space 29 is reduced thereby increasing the air pressure in the inner space 29. The pressure in the inner chamber 26B is also increased to develop a pressure difference between the outer and inner chambers 26A, 26B. Such a pressure difference is however eliminated by rightward movement of the partition 28 in the chamber 26.

Figure 13:
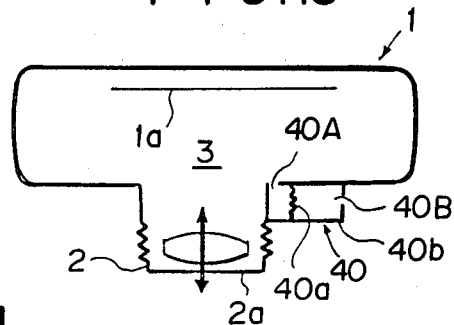
FIG. 13 is a schematic horizontal cross-sectional view illustrating another principle of the present invention.

FIG. 13 schematically shows a water-resistant camera based on a different principle of the present invention. The camera has a camera body 1 and a lens barrel 2 mounted on a front panel of the camera body 1. The lens barrel 2 is movable toward and away from the camera body 1 so that the distance between a foremost glass panel 2a of the lens barrel 2 and the focal plane 1a in the camera body 1 can be varied continuously. The camera has an inner space 3 whose volume varies in response to movement of the lens barrel 2 toward and away from the camera body 1. A pressure-absorbing chamber 40 is mounted on the front panel of the camera body 1, the chamber 40 having a port 40A in one end communicating with the inner space 3 of the camera and another port 40B in the opposite end which is vented to the exterior. Within the chamber 40, there is disposed a pressure-responsive diaphragm 40a comprising a bellows securely attached to the front panel of the camera body 1 and a cover 40b which defines the chamber 40. The bellows 40a is positioned between the ports 40A, 40B and is flexibly movable in response to back-and-forth movement of the lens barrel 2 to keep the air pressure in the inner space 3 at a substantially constant level. More specifically, when the lens barrel 2 is retracted (upwardly in FIG. 1), the air pressure in the inner space 3 is increased to move the bellows 40a to the right. When the lens barrel 2 is pushed out (downwardly in FIG. 1), the air pressure in the inner space 3 is reduced to move the bellows 40a to the left under external air or water pressure. Of course, the air pressure in the inner space 3 is increased when the camera is placed underwater, and is lowered when in air.

FIGS. 14 through 17 show a water-resistant camera for underwater use according to a still further embodiment of the present invention based on the principle shown in FIG. 13. A cover 40b surrounding a lens barrel 32 and defining a pressure-absorbing chamber is secured to the front panel of a camera body 31, the pressure-absorbing chamber being disposed laterally of the lens barrel 32. The cover 40b has a port 40B defined in a side wall thereof and vented to the exterior, and another port 40A is defined in the front panel of the camera body 31 in communication with the inner space in the camera body 31. A pressure-responsive bellows 40a which may be made of rubber is disposed between the ports 40A, 40B and positioned more closely to the port 40A. The bellows 40a is secured to the front panel of the camera body 31 and the cover 40b to isolate the ports 40A, 40B in a fluid-tight manner. The bellows 40a is flexibly movable or selectively expansible and collapsible in response to variations in the air pressure in the inner space of the camera.

Figure 14:
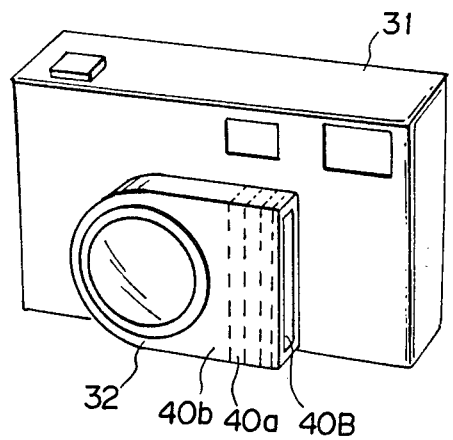
FIGS. 14 and 15 are perspective views of a water-resistant camera according to a still further embodiment of the present invention, the views showing a wide-angle position and a telephoto position, respectively.

In FIGS. 14 and 16, the lens barrel 32 is shown retracted back into the camera body to a wide-angle position while the camera is used underwater. At this time, the inner space 33 of the camera is reduced, and an increased air-pressure buildup in the inner space 33 expands the bellows 40a toward the port 40B. This movement of the bellows 40a allows air to flow from the inner space 33 into the chamber 40 through the port 40A and also displaces air from the chamber 40 through the port 40B. Therefore, the air pressure in the inner camera space 33 is lowered.

Figure 15:
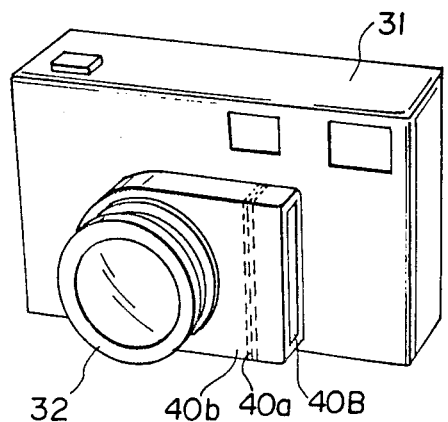

In FIGS. 15 and 17, the lens barrel 32 is shown projected out of the camera body 31 to a telephoto position. Since the inner space 33 of the camera is enlarged, the air pressure therein is lowered thereby to allow water pressure outside of the camera to push the bellows 40a backwards into a collapsed state. Air is now forced from the chamber 40 into the inner space 33 through the port 40A while introducing air or water into the chamber 40 through the port 40B. The air pressure in the inner camera space 33 is now increased. Therefore, the air pressure in the inner camera space 33 remains substantially constant irrespective of whether the lens barrel 32 is moved to the wide-angle position or the telephoto position. The lens barrel 32 can smoothly be moved back and forth since the bellows 40a is automatically expanded or collapsed in response to variations in the air pressure in the inner camera space 33.

The bellows 40a may be colored, and the cover 40b may partially be made transparent to permit the bellows 40a to be visually observed from outside. Thus, the wide-angle position and the telephoto position can be recognized by the position of the bellows 40a in the chamber 40.

The water-resistant camera shown in FIGS. 16 and 17 has a lens barrel mechanism which is identical to that which is illustrated in FIGS. 4 and 5.

Figure 18:
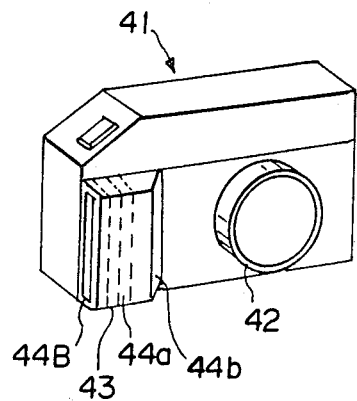
FIGS. 18 and 19 are perspective views of a water-resistant camera according to a yet still further embodiment of the present invention, the views showing a wide-angle position and a telephoto position, respectively.
Figure 19:
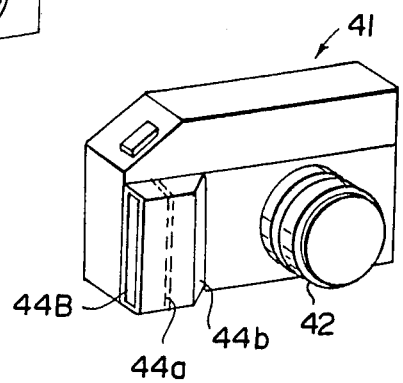
Figure 20:
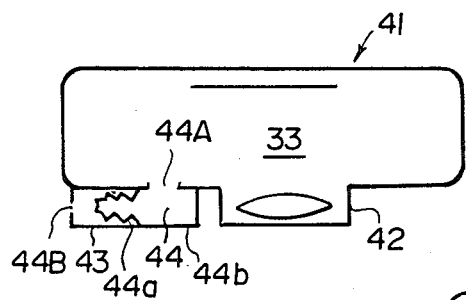
FIGS. 20 and 21 are schematic horizontal cross-sectional views of the camera shown in FIGS. 18 and 19.
Figure 21:
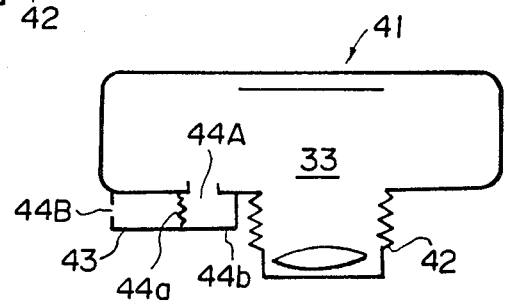

FIGS. 18 through 21 illustrate a water-resistant camera according to a still further embodiment of the present invention. In this embodiment, a camera 41 has a movable lens barrel 42 and a grip 43 mounted on one side of a front panel of the camera body, the grip 43 defining therein a chamber 44. The chamber 44 houses therein a pressure-sensitive bellows 45 fixedly attached to the front panel of the camera body and a cover 44b of the grip 43. The chamber 44 has a port 44A positioned on one side of the bellows 44a and communicating with the inner space 33 of the camera 41 and another port 44B positioned on the opposite side of the bellows 44a and vented to the exterior. When the lens barrel 42 is in a wide-angle position as shown in FIGS. 18 and 20, the bellows 44a is expanded toward the port 44B. When the lens barrel 42 is in a telephoto position as shown in FIGS. 19 and 21, the bellows 44a is collapsed toward the port 44A.

It is preferable that the bellows 40a, 44a be integrally formed with the associated camera components because this enables the camera structure to be simplified.

According to another embodiment of the present invention shown in FIGS. 22 through 25, a water-resistant camera has a lens barrel 45 movable toward and away from the camera body 46 in a fluid-tight manner and a retractable electronic flash 47 movable into and out of the camera body 46 in a fluid-tight manner, the lens barrel 45 and the electronic flash 47 being ganged to each other.

Figure 22:
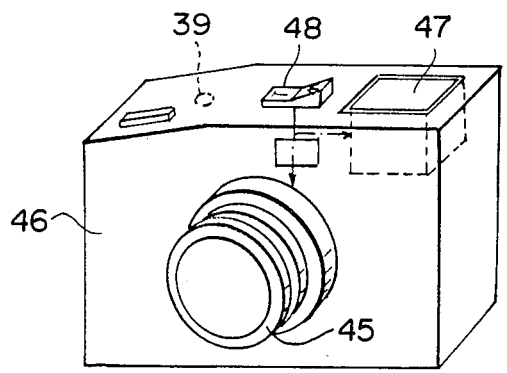
FIGS. 22 and 23 are perspective views of a water-resistant camera according to another embodiment of the present invention, the views showing a telephoto position and a wide-angle position, respectively.
Figure 23:
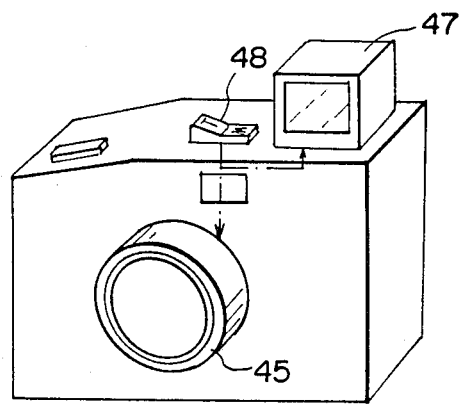

The lens barrel 45 can be moved between a telephoto position shown in FIG. 22 and a wide-angle position shown in FIG. 23 by means of an electric motor (not shown) energized by a switch 48 mounted on the upper panel of the camera body 46. When the lens barrel 45 is in the telephoto position, the volume of the inner space of the camera is increased and the air pressure in the inner space is reduced since the lens barrel 45 is projected out of the camera body 46. Conversely, when the lens barrel 45 is in the wide-angle position, the volume of the inner space of the camera is reduced and the air pressure in the inner space is increased since the lens barrel 45 is retracted into the camera body 46. To absorb such pressure variations, the electronic flash 47 is movable in response to movement of the lens barrel 45 between a first position in which the electronic flash 47 is retracted in the camera body 46 and a second position in which the electronic flash 47 is projected out of the camera body 46. More specifically, when the lens barrel 45 is projected into the telephoto position, the electronic flash 47 is retracted into the camera body 46 as shown in FIG. 22, and when the lens barrel 45 is retracted into the wide-angle position, the electronic flash 47 is projected out of the camera body 46 as shown in FIG. 23. The amount by which the volume of the inner space of the camera body 46 is varied by the movement of the lens barrel 45 is substantially equalized to the amount by which the volume of the inner space of the camera body 46 is varied by the movement of the electronic flash 47. Therefore, the changes in the volume of the inner space of the camera body 46 which are caused by the movement of the lens barrel 45 can be offset by the changes in the volume of the inner space of the camera body 46 which are caused by the movement of the electronic flash 47. Thus, the air pressure within the camera body 46 is maintained at a substantially constant level regardless of the position of the lens barrel 45. The electronic flash 47 can be moved between the first and second positions in response to operation of the switch 48.

The electronic flash 47 is normally used when the lens barrel 45 is in the wide-angle position. When the lens barrel 45 is brought into the wide-angle position, the electronic flash 47 is automatically popped up into the projected position. The electronic flash 47 can then be turned on in the known manner in response to depression of a shutter release button. The electronic flash 47 may also be turned on while it is in the retracted position. In such a case, a lens for adjusting the angle through which light is emitted should be mounted on the camera body 46 in confronting relation to the electronic flash 47 as it is retracted or popped down.

Although not shown, the lens barrel 45 incorporates therein a lens barrel mechanism which is identical to the structure shown in FIGS. 4 and 5.

Figures 24, 25:
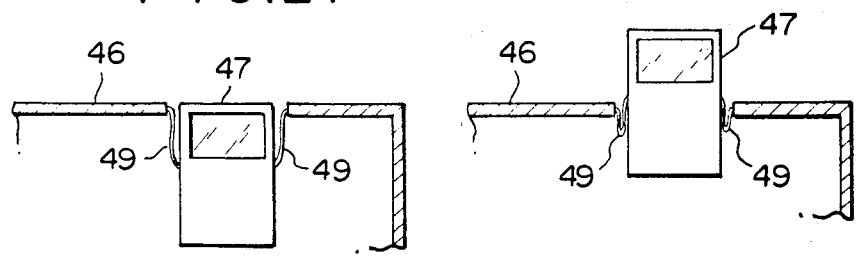
FIGS. 24 and 25 are fragmentary cross-sectional views of a portion of the camera of FIGS. 22 and 23 which includes an electronic flash.

As illustrated in FIGS. 24 and 25, the electronic flash 47 is joined by a flexible fluid-tight seal member 49 to the camera body 46 and movable by a suitable moving mechanism between the retracted position of FIG. 24 and the projected position of FIG. 25.

If it is desired to retract the electronic flash 47 in the camera body 46 and at the same time to place the lens barrel 45 in the wide-angle position for storing the camera, a manually closable and openable air valve 39 may be provided on the camera body 46 as indicated by the dotted line in FIG. 22, and either one of the electronic flash 47 and the lens barrel 45 may be made manually movable. More specifically, when storing the camera, the air valve 39 is manually opened and then the electronic flash 47 or the lens barrel 45 is manually pushed into the camera body 46. At this time, a certain mount of air is discharged from the camera body 46 through the air valve 39, and thereafter the air valve 39 is manually closed. For using the camera, the air valve 39 is manually opened, and the electronic flash 47 or the lens barrel 45 is pulled out of the camera body 46. At this time, a certain amount of air is drawn into the camera body 46 through the air valve 39, and thereafter the air valve 39 is manually closed. Thereafter, the lens barrel 45 can be moved into the telephoto position or the wide-angle position by the switch 48. It is to be noted that the air valve 39 should not be opened and hence no air should be discharged or introduced while the camera is placed underwater.

Figure 26:
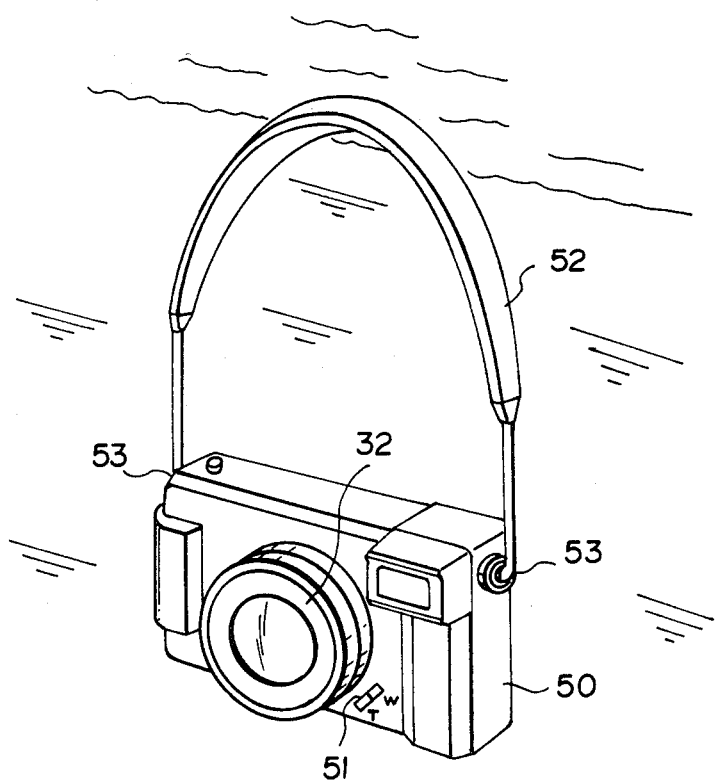
FIG. 26 is a perspective view of a water-resistant camera according to still another embodiment of the present invention.

FIG. 26 shows a water-resistant camera according to still another embodiment of the present invention. The water-resistant camera has a camera body 50 with a movable lens barrel 32 mounted on its front panel. The lens barrel 32 is movable selectively into a telephoto position (FIG. 27) and a wide-angle position (FIG. 28) by means of a suitable mechanism operated by a selector switch 51. The camera is selectively coupled to a strap 52 with its opposite ends engaging strap fittings 53 on side walls of the camera body 50. The strap 52 is of a hollow construction, as described later on, which is held in communication with the interior of the camera body 50.

The lens barrel 32 has a lens barrel mechanism which is identical to the mechanism shown in FIGS. 4 and 5.

Figure 27:
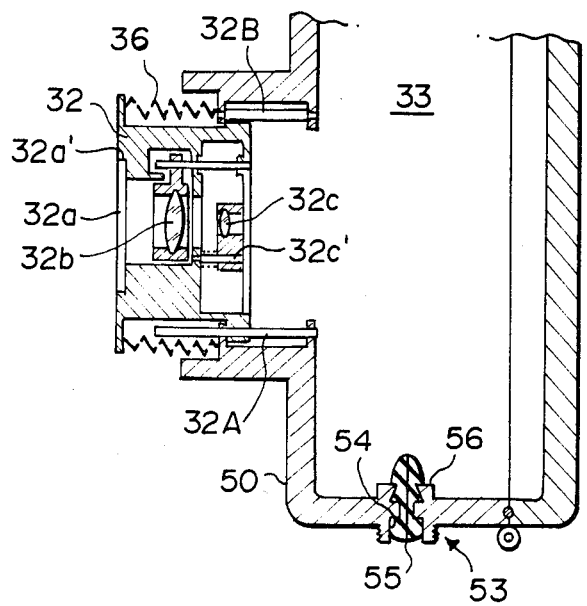
FIGS. 27 and 28 are fragmentary horizontal cross-sectional views of the water-resistant camera shown in FIG. 26, the views showing a telephoto position and a wide-angle position, respectively.
Figure 28:
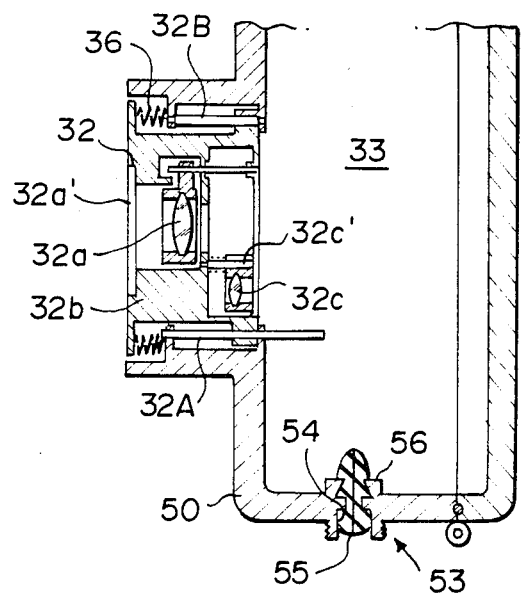
Figure 29:
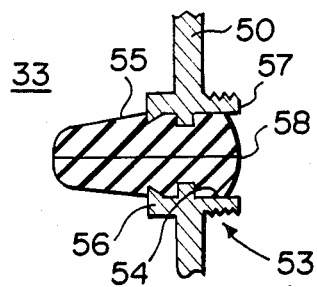
FIG. 29 is an enlarged cross-sectional view of a connector on the camera body of the camera shown in FIGS. 27 and 28.

As shown in FIGS. 27 through 29, the side walls of the camera body 50 have respective holes or ports 54 (only one shown), and a rubber plug 55 is sealingly fitted in each of the holes 54. Each of the strap fittings 53 includes a sleeve 56 defining the hole 54 therein and having one end projecting out of the camera body 50. The projecting end of the sleeve 56 is externally threaded at 57. The rubber plug 55 has a central slit 58 which is normally closed under the resiliency of the rubber plug 55.

Figure 30:
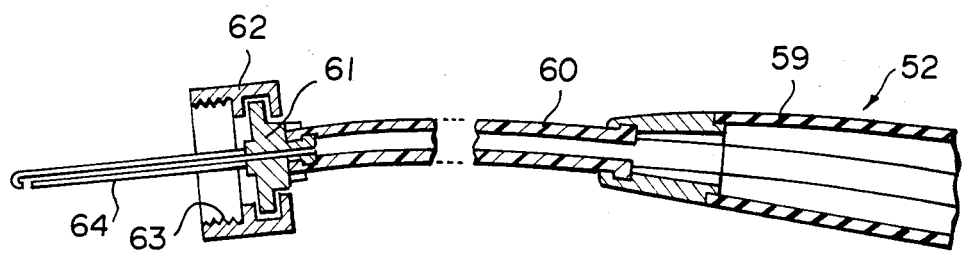
FIG. 30 is an enlarged fragmentary cross-sectional view of a strap shown in FIG. 26.
Figure 31:
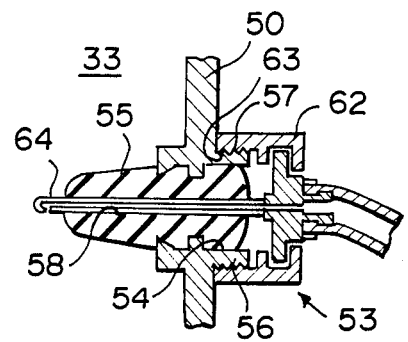
FIG. 31 is an enlarged cross-sectional view of the connector of FIG. 29 to which the strap of FIG. 30 is coupled.

As shown in FIG. 30, the strap 52 includes an elongate central hollow rubber tube 59 and a pair of opposite flexible pipes 60 (only one shown) of plastic, for example, which are connected to the opposite ends of the rubber tube 59. A connector 61 is fixed to the outer end of each of the pipes 60. A retaining ring 62 with its inner surface internally threaded at 63 is loosely mounted on the connector 61. The strap 52 can be joined to the side walls of the camera body 50 by attaching the retaining rings 62 in threaded engagement with the sleeves 56, respectively, as shown in FIG. 31.

A hollow needle 64 is attached coaxially to the connector 61 and communicates with the interior of the pipe 60. When the retaining ring 62 is threadedly mounted on the sleeve 56, the needle 64 is inserted through the slit 58 of the plug 55 into the inner space 33 of the camera body 50, as shown in FIG. 31. Therefore, with the strap 52 attached to the camera body 50, the interior of the strap 52 is held in communication with the inner space 33 of the camera body 50.

When the lens barrel 32 is moved from the wide-angle position of FIG. 28 to the telephoto position of FIG. 27, the lens barrel 32 is projected out to increase the volume of the inner space 33 of the camera body 50. Air in the rubber tube 59 is now drawn through the pipes 60 and the needles 64 into the inner space 33. The lens barrel 32 can therefore be smoothly shifted to the telephoto position.

For moving the lens barrel 32 from the telephoto position to the wide-angle position, the lens barrel 32 is pushed in. At this time, the volume of the inner space 33 is reduced to increase the air pressure therein. Air is discharged from the inner space 33 through the needles 64 and the pipes 60 into the tube 59.

Accordingly, variations in the air pressure in the fluid-tight camera body 50 resulting from back-and-forth movement of the lens barrel 32 can be absorbed by the expansible and contractable space in the rubber tube 59 which communicates with the inner space of the camera body 50, thus allowing the lens barrel 32 to move smoothly back and forth.

The tube 59 may be made of any of various other elastomeric materials than rubber. Moreover, the hole 54 and the strap fitting 53 may be provided on only one of the side walls of the camera body 50.

Figure 32:
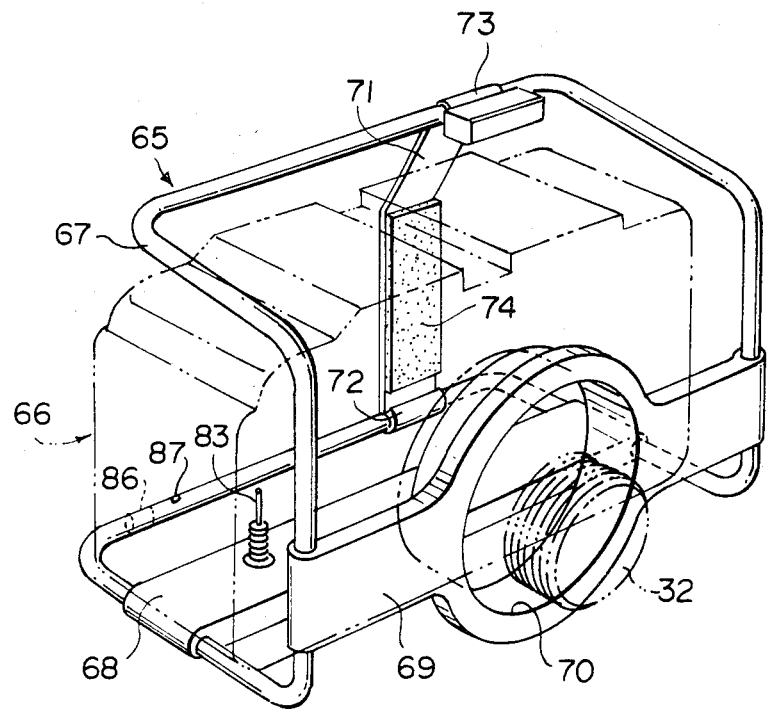
FIG. 32 is a perspective view of a water-resistant camera according to yet another embodiment of the present invention.

FIG. 32 shows a water-resistant camera constructed in accordance with yet another embodiment of the present invention. The water-resistant camera of this embodiment is combined with a camera protector 65 which extends around the camera for protection against accidental collision with objects. The camera has a camera body 66 on which a lens barrel 32 is mounted. Although not shown, the lens barrel 32 incorporates a lens barrel mechanism which is identical to that shown in FIGS. 27 and 28.

The camera protector 65 is constructed of a pipe frame 67 with a camera support base 68 on the lower side of the frame 67 and a front plate 69 on the front side thereof. The camera body 66 is mounted on the camera support base 68 by means of a screw (not shown) threaded in a tripod screw 75 (FIG. 33) of the camera body 66. The front plate 69 has a central hole 70 in which the lens barrel 32 is positioned. A holder 71 is pivotally attached to the rear side of the frame 67 for pivotal movement about its lower pivot 72. With the camera body 66 placed on the camera support base 68, the holder 71 is turned about the pivot 72 against the camera body 66, and the upper end 73 of the holder 71 is locked onto the pipe frame 67 for securely holding the camera body 66 in the frame 67. The holder 71 has a resilient pad 74 for engaging the camera body 66 to lock the same firmly in place.

As shown in FIG. 33, the tripod screw hole 75 is defined in the bottom panel of the camera body 66, which also has a sleeve 76 defining a port or hole 77 above the tripod screw hole 75, the hole 77 communicating with the inner space 33 of the camera body 66. A rubber plug 78 with a normally closed central slit 79 is fitted in the hole 77.

FIG. 34 shows an internal structure of the camera support base 68 of the camera protector 65. The camera support base 68 has a recess 80 housing therein an attachment knob 81 having a screw 82 projecting upwardly beyond the upper surface of the camera support base 68. The screw 82 can be threaded into the tripod screw hole 75 by turning the attachment knob 81. A hollow needle 83 is coaxially attached to and extends through the knob 81 and the screw 82. The needle 83 is held in communication with the tubular interior space 84 of the pipe frame 67 through a passage 85 defined in the camera support base 68. As shown in FIGS. 32 and 35, a piston 86 is slidably disposed in the tubular space 84 of the pipe frame 67, which has a small hole 87 defined behind the camera base support 68. The tubular space 84 is vented to the exterior through the small hole 87. The piston 86 is movably disposed in the section of the pipe frame 68 which extends between the passage 85 and the small hole 87. When air in the tubular space 84 is drawn via the passage 85 and the needle 83 into the inner camera space 33, the piston 86 is moved leftwards to the solid-line position (FIG. 35) to draw air or water via the small hole 87 into the pipe frame 67. When air is forced from the inner camera space 33 into the tubular space 84 via the needle 83 and the passage 85, the piston 86 is moved rightwards to the dotted-line position to discharge air or water via the small hole 87.

When the lens barrel 32 is projected from the wide-angle position to the telephoto position, the inner camera space 33 is increased in volume thereby to draw air from the tubular space 84 through the passage 85 and the needle 83 into the inner camera space 33. Therefore, the lens barrel 33 can smoothly be moved into the telephoto position.

When the lens barrel 32 is retracted from the telephoto position to the wide-angle position, the volume of the inner camera space 33 is reduced and the air pressure therein is raised. Therefore, air is forced from the inner camera space 33 via the needle 83 and the passage 85 into the tubular space 84, allowing the lens barrel 33 to be smoothly shifted to the wide-angle position.

Therefore, since the inner camera space 33 which varies upon back-and-forth movement of the lens barrel 32 communicates with the expansible and contractable space in the camera protector 65, variations in the volume of the inner camera space 33 of the fluid-tight camera body 66 can be automatically taken up for thereby allowing smooth movement of the lens barrel 32.

The space 84 is shown as being expansible and contractable by the piston 86 and the small hole 87, the space 84 may be made expansible and contractable by being defined in a tube of rubber or other elastomeric material.

Although certain preferred embodiments have been shown and described, it should be understood that many changes and modifications may be made therein without departing from the scope of the appended claims.

For example, the movement of the lens barrel toward and away from the fluid-tight camera body may not be limited for switching between the wide-angle and telephoto positions but may be for varying the focal length of the lens to effect zooming or for moving a collapsible lens assembly to pull out the lens barrel to the taking position and push it into the camera body to make the camera compact in size.

We claim:

1. A water-resistant camera comprising:
   (i) a fluid-tight camera body;
   (ii) a lens barrel mounted on said camera body and movable toward and away from said camera body in a fluid-tight manner, said camera body and said lens barrel having an inner space; and
   (iii) means communicating with said inner space for automatically maintaining the air pressure in the inner space at a substantially constant level regardless of movement of said lens barrel toward and away from said camera body.

2. A water-resistant camera according to claim 1, wherein said means comprises a cylinder mounted on said camera body and having a first port communicating with said inner space and a second port vented to the exterior of the camera body, and a piston slidably disposed in said cylinder and isolating said first and second ports from each other in a fluid-tight manner.

3. A water-resistant camera according to claim 2, wherein said camera body has a front panel on which said lens barrel is mounted, said cylinder being disposed on said front panel.

4. A water-resistant camera according to claim 2, wherein said camera body has an upper panel on which said cylinder is disposed.

5. A water-resistant camera according to claim 2, wherein said cylinder is at least partly transparent, said piston being colored so as to be visible from outside of said cylinder for confirmation of its position with respect to the cylinder.

6. A water-resistant camera according to claim 1, wherein said means comprises a support cylinder projecting from said camera body, and a double-wall structure on said lens barrel, including an inner barrel member slidably fitted in said support cylinder, an outer barrel member radially spaced from said inner barrel member, a chamber defined between said inner and outer barrel members, and a radial partition disposed in said chamber between said inner and outer barrel members in a fluid-tight manner and dividing said chamber into a first chamber communicating with said inner space and a second chamber vented to the exterior of the camera body.

7. A water-resistant camera according to claim 6, wherein said support cylinder has a first port providing communication between said first chamber and said inner space, said double-wall structure further including a joint wall interconnecting said inner and outer barrel members and having a second port through which said second chamber is vented to the exterior of the camera body.

8. A water-resistant camera according to claim 7, wherein said first port is defined substantially central in said support cylinder in an axial direction thereof, said inner barrel member having a passage providing communication between said first port and said inner space.

9. A water-resistant camera according to claim 7, wherein said first port is defined in said support cylinder, said support cylinder having a passage providing communication between said first port and said inner space.

10. A water-resistant camera according to claim 6, wherein said radial partition is joined to said support cylinder.

11. A water-resistant camera according to claim 6, wherein said radial partition is slidably disposed in said chamber.

12. A water-resistant camera according to claim 1, wherein said means comprises a cover mounted on said camera body and defining a chamber having a first port communicating with said inner space and a second port vented to the exterior of the camera body, and a pressure-sensitive bellows disposed in said chamber and isolating said first and second ports from each other in a fluid-tight manner.

13. A water-resistant camera according to claim 12 wherein said camera body has a front panel on which said lens barrel is mounted, said cover being disposed on said front panel.

14. A water-resistant camera according to claim 12, wherein said cover is at least partly transparent, said bellows being colored so as to be visible from outside of said chamber for confirmation of its position with respect to the chamber.

15. A water-resistant camera according to claim 13, further including a grip mounted on said front panel, said grip including said cover.

16. A water-resistant camera according to claim 1, wherein said means comprises an electronic flash movable between a first position in which the electronic flash is retracted in said inner space and a second position in which the electronic flash is projected out of said inner space, said electronic flash being ganged with said lens barrel such that the electronic flash is moved into said first position when said lens barrel is moved away from said camera body, and the electronic flash is moved into said second position when said lens barrel is moved toward said camera body.

17. A water-resistant camera according to claim 16, wherein said electronic flash is joined to said camera body through a flexible fluid-tight sealing member.

18. A water-resistant camera according to claim 16, wherein said camera body has a manually operable air valve for selectively venting said inner space to the atmosphere.

19. A water-resistant camera comprising:
(i) a fluid-tight camera body;
(ii) a lens barrel mounted on said camera body and movable toward and away from said camera body in a fluid-tight manner, said camera body and said lens barrel having an inner space; and
(iii) means adapted to communicate with said inner space for automatically maintaining the air pressure in the inner space at a substantially constant level regardless of movement of said lens barrel toward and away from said camera body.

20. A water-resistant camera according to claim 19, wherein said camera body has at least one strap fitting including an elastomeric plug having a normally closed slit, said means comprising a hollow strap defining an expansible and contractable space therein and a hollow needle communicating with said expansible and contractable space and insertable through said normally closed slit into said inner space.

21. A water-resistant camera according to claim 20, wherein said hollow strap includes an elastomeric tube defining said expansible and contractable space therein.

22. A water-resistant camera according to claim 19, wherein said camera body has a tripod screw hole and an elastomeric plug disposed adjacent to said tripod screw hole and having a normally closed slit, said means comprising a camera protector connectable to said camera body in surrounding relation thereto, said camera protector having an expansible and contractable space and a hollow needle communicating with said expansible and contractable space and insertable through said normally closed slit into said inner space.

23. A water-resistant camera according to claim 22, wherein said camera protector comprises a tube frame with a piston movably disposed in said tube frame, said piston defining said expansible and contractable space in said tube frame.

* * * * *